United States Patent [19]

Funaki et al.

[11] Patent Number: 4,710,779
[45] Date of Patent: Dec. 1, 1987

[54] OPTICAL RECORDING APPARATUS

[75] Inventors: Shinsuke Funaki, Hachioji; Yuichi Akanabe, Kunitachi; Hiroaki Ikeda, Tachikawa, all of Japan

[73] Assignee: Konishiroku Photo Industry Co., Ltd., Tokyo, Japan

[21] Appl. No.: 769,763

[22] PCT Filed: Nov. 13, 1981

[86] PCT No.: PCT/JP81/00333
§ 371 Date: Jul. 1, 1982
§ 102(e) Date: Jul. 1, 1982

[87] PCT Pub. No.: WO82/01797
PCT Pub. Date: May 27, 1982

Related U.S. Application Data

[63] Continuation of Ser. No. 395,007, Jul. 1, 1982, abandoned.

[30] Foreign Application Priority Data

Nov. 14, 1980 [JP] Japan .................... 55-160573

[51] Int. Cl.$^4$ .............. G01D 18/00; G11B 7/00; H04N 1/23; H01S 3/13
[52] U.S. Cl. .................. 346/1.1; 346/76 L; 346/108; 346/160; 369/44; 358/300; 372/29; 250/205

[58] Field of Search .......... 346/76 L, 1.1, 108, 346/160; 358/256, 300; 369/44; 372/29; 250/205

[56] References Cited

U.S. PATENT DOCUMENTS

| | | | |
|---|---|---|---|
| 4,201,994 | 5/1980 | Hoshito et al. | 346/108 |
| 4,243,951 | 1/1981 | Wolkstein et al. | 372/26 |
| 4,329,659 | 5/1982 | Chen | 372/29 |
| 4,363,116 | 12/1982 | Kleuters et al. | 369/30 |
| 4,443,695 | 4/1984 | Kitamura | 250/205 |
| 4,443,696 | 4/1984 | Taboada | 250/205 |

FOREIGN PATENT DOCUMENTS 54-13343 1/1979 Japan .
54-74766 6/1979 Japan .

Primary Examiner—E. A. Goldberg
Assistant Examiner—Gerald E. Preston
Attorney, Agent, or Firm—Jordan B. Bierman

[57] ABSTRACT

Herein disclosed is a recording apparatus for using a semiconductor laser 1 as a light source so that the scanning operation may be conducted with the laser beam which has been modulated on the basis of picture information. The drive current of the semiconductor laser 1 for making the monitor current of an optical output constant is determined before the beginning of a recording period so that the drive current may be used as that of the semiconductor laser 1 during the recording period.

4 Claims, 5 Drawing Figures

OPTICAL RECORDING APPARATUS

This application is a continuation of application Ser. No. 395,007, filed July 1, 1982, now abandoned.

DESCRIPTION

1. Technical Field

The present invention relates to a recording apparatus for using a semiconductor laser as a light source so that the scanning operation may be conducted with the laser beam which has been modulated on the basis of picture information.

2. Background Art

Since the optical output of a semiconductor laser has a high temperature dependency, it has to be stabilized so that the semiconductor laser may be used as the light source for a recording apparatus. As one of those stabilizing methods, according to the prior art, there has been known a method for conducting the temperature control of a laser diode. However, since there exists a temperature difference (which is not constant) between a case (i.e., a mount) providing a temperature detection point and the chip of the laser diode, the optical output is so highly fluctuated as to make it difficult for that method by itself to limit the optical output within an allowable fluctuation range. In the recording apparatus of that kind, moreover, since the average output of the laser diode during the recording operation is not constant, it has also been impossible to use such a stabilizing method in a laser for light communication which controls the drive current of the laser diode with the average output of the laser diode.

Under the circumstances thus far described, there has recently been proposed a recording apparatus using a method, in which a sampling period synchronized with a beam position detection signal is prepared during a recording period so that the laser beam may be partially sampled through a beam splitter to detect the intensity of the laser beam thereby to control the drive current of the laser diode. In this recording apparatus, however, since the sampling period is prepared during the recording period and upon each scanning operation of one line, there arises a problem that the sampling period is so short that the frequency response of a feedback system has to be remarkably enhanced. This results in a limit in increasing the printing speed. Moreover, there arises another problem that the sampling operation has to be conducted in synchronism with the beam detection signal to require complex sequences so that the circuit construction becomes complicated. Still another problem is that the non-linearity of the beam splitter leads to a detection error in the beam intensity to rise a disadvantage.

DISCLOSURE OF INVENTION

The present invention has been conceived so as to solve the problems thus far described and has an object to provide a recording apparatus which is enabled to print at a high speed while having a simple construction.

The fundamental construction of the present invention for achieving that object is characterized in that a semiconductor laser is driven before the beginning of a recording period to determine its drive current for making the monitor current of its optical output constant so that the drive current may be used as that of the semiconductor laser during the recording period.

BEST MODE FOR CARRYING OUT THE INVENTION

The present invention will be described in detail in the following with reference to the accompanying drawings.

Figure 1:
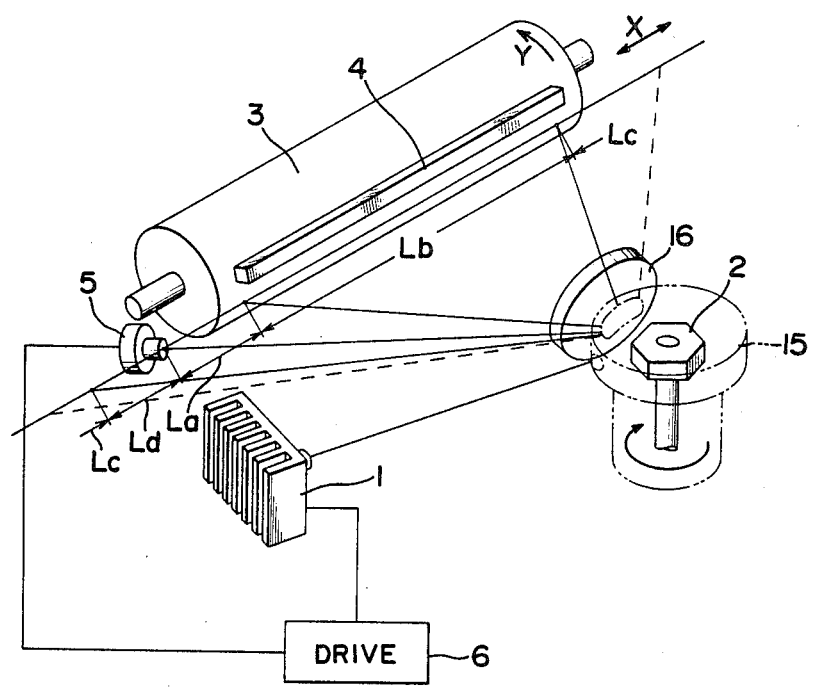
FIG. 1 is a schematic view showing the construction of the essential portion of one embodiment of a recording apparatus according to the present invention.

FIG. 1 is a schematic view showing the construction of the essential portion of one embodiment of the recording apparatus according to the present invention using a transfer type electronic photography. Reference numeral 1 indicates a semiconductor laser device which has a laser diode therein, and numeral 2 indicates a polygonal rotary mirror for reflecting the laser beam which is generated by the semiconductor laser device 1. That rotary mirror 2 is rotated at a constant speed in the direction of arrow of the drawing so that the laser beam may run in a main scanning direction X. Numeral 15 indicates a shroud which is provided to cover the area outside of that, in which the laser beam is incident thereupon and reflected therefrom, for protecting the rotary mirror against dust and for sound-proofing and safety purposes. Numeral 3 indicates a photosensitive drum which is rotated in an auxiliary scanning direction Y and which is constructed by evaporating a photoconductive insulating layer of selenium upon the surface of a hollow aluminum cylinder. Numeral 4 indicates a charger for uniformly charging the surface of the photosensitive drum 3 so that the photosensitive drum 3 charged thereby may have its surface irradiated with the laser beam, which has been reflected by the aforementioned rotary mirror 2, to form an electrostatic latent image. In the drawing being viewed, incidentally, a developer for forming the aforementioned latent image as a hard copy, a thermal fixer, a paper charging and discharging mechanism, and so on are not shown. Numeral 5 indicates a phototransistor for detecting the position of the laser beam. Numeral 6 indicates an electric circuit unit having a variety of functions including one to feed the semiconductor laser device 1 with a drive current. Numeral 16 indicates an f-$\theta$ lens for focusing the laser beam upon the surface of the photosensitive drum 3.

Figure 2:
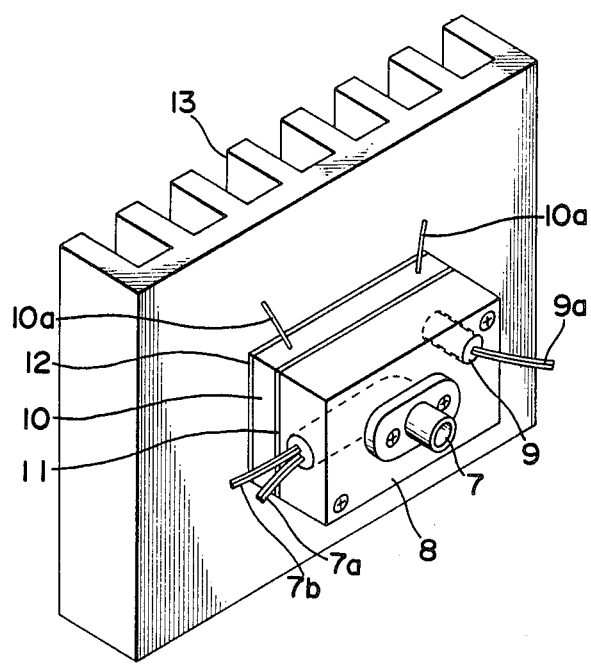
FIG. 2 is a perspective view showing a semiconductor laser device appearing in FIG. 1.

The semiconductor laser device 1 appearing in FIG. 1 is shown in detail in FIG. 2. In FIG. 2, numeral 7 indicates a laser diode element which includes therein a laser diode chip and a PIN photo diode for converting an optical output into an electric current. The laser diode element is equipped with lead lines 7a for supplying the drive current and lead lines 7b for receiving a monitor current. The monitor current received by lead lines 7b indicates the optical output itself of the laser diode. Numeral 8 indicates a mount which is made of a material having a high thermal conductivity for mounting the laser diode element 7 thereon. Numeral 9 indicates a thermister which is buried in the mount 8, and numeral 9a indicates lead lines thereof. On the other hand, numeral 10 indicates an electronic refrigeration element which is laminated upon the mount 8 through an insulating substrate 11. The electronic refrigeration element 10 makes use of the "Pel tier effect" for extracting heat from or imparting heat to the mount 8 in accordance with the current to flow through the lead lines 10a thereof. Numeral 13 indicates a heat sink which is laminated upon the electronic refrigeration element 10 through an insulating plate 12 for radiating the heat, which is transferred from the electronic refrigeration element 10, into the atmosphere.

Figure 3:
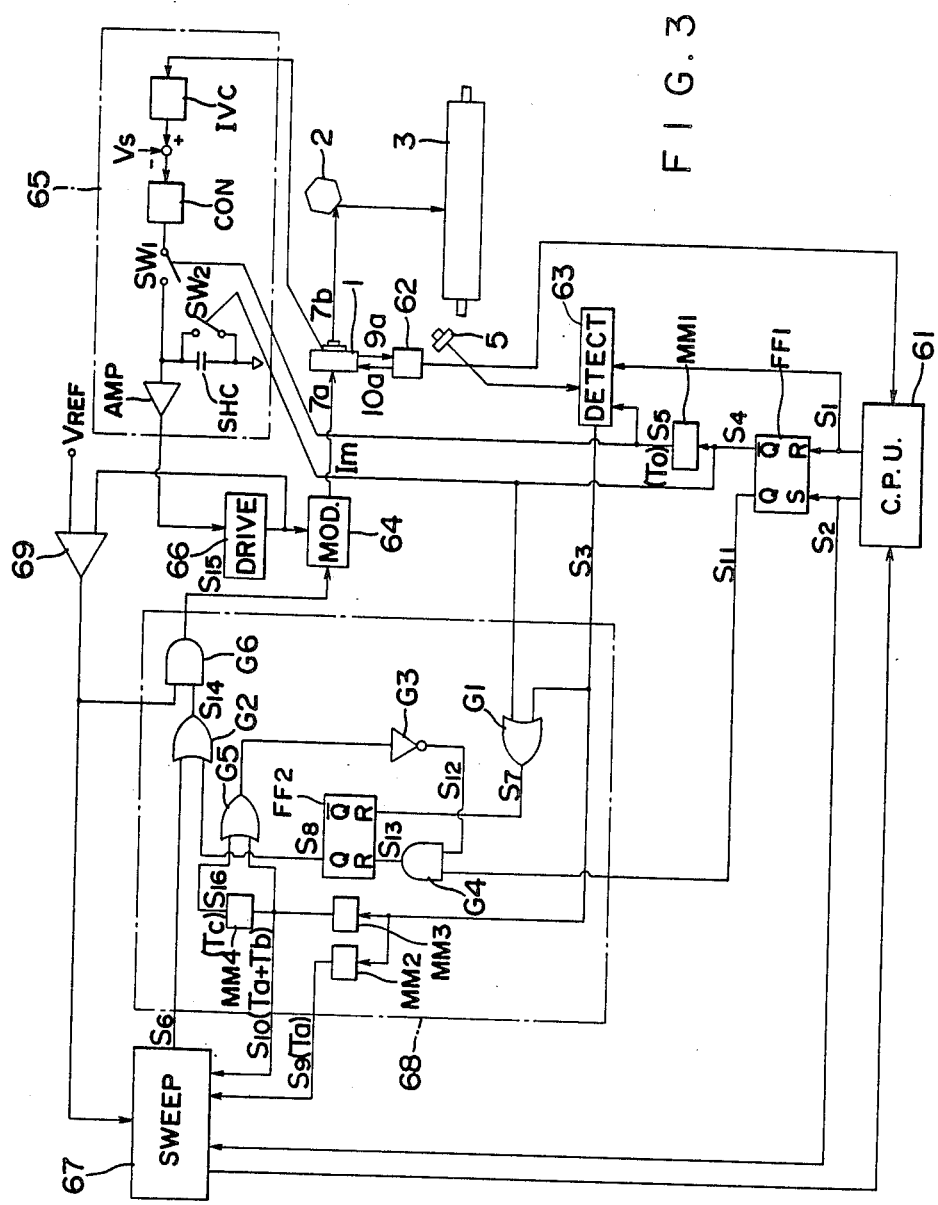
FIG. 3 is an electric circuit diagram showing the essential portion of the apparatus of FIG. 1.
Figure 4:
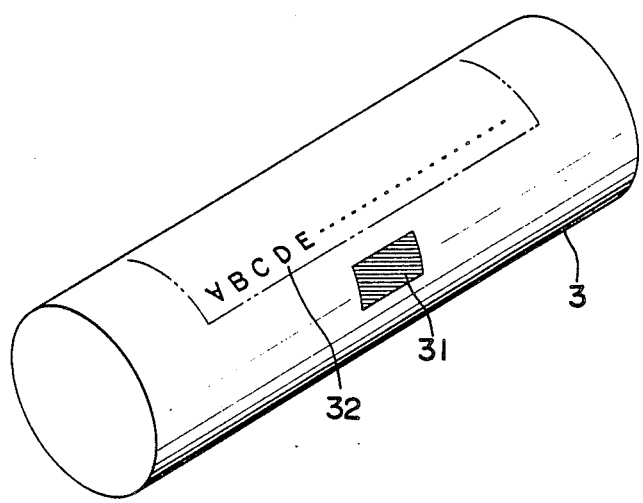
FIG. 4 is an explanatory view showing the writing operation of a badge or the like on a photosensitive drum.

FIG. 3 is an electric circuit diagram of the apparatus of FIG. 1 and mainly shows the detail of the electric circuit unit 6 appearing in FIG. 1 (but omits the circuit of a portion for realizing the transfer type electronic photography). In FIG. 3, numeral 61 indicates a central processing unit for receiving information to effect the sequential control of the recording apparatus as a whole, which unit includes a micro computer and so on. In the case of the present embodiment, as shown in FIG. 4, a badge 31 having a reference density for detecting the toner density is written on the photosensitive drum 3, and a normal picture information 32 is then written therealong (Here, only the normal picture information makes a hard copy). Therefore, the central processing unit 61 generates, upon reception of a print signal, a beam-on signal $S_1$ for driving the laser device 1 and then a badge-on signal $S_2$ for beginning to write the badge with the laser beam. Reference letters FF1 indicate a flip-flop which is to be set by the rise of the badge-on signal $S_2$ and to be reset by the break of the beam-on signal $S_1$. Letters MM1 indicate a monostable multivibrator for generating a pulse signal $S_5$ having a pulse width $T_0$ in synchronism with the break of the output signal $S_4$ of a terminal $\overline{Q}$ of the flip-flop FF1. The aforementioned beam position detecting circuit 63 is constructed such that its output gate is opened by the break of the output pulse signal $S_5$ of that monostable multivibrator MM1 and closed by the break of the beam-on signal $S_1$.

Numeral 64 indicates a laser modulating circuit for feeding the laser device 1 with a modulated current Im. Numeral 65 indicates a sample hold circuit for receiving the monitor current of the laser modulating circuit 64. Numeral 66 indicates a driving power source for feeding the laser modulating circuit 64 with the drive voltage according to the output voltage of the sample hold circuit 65. Numeral 69 indicates a comparator for comparing the output of the driving power source 66 and a constant voltage $V_{REF}$ to generate an "L" level signal, if the former voltage is higher than the voltage $V_{REF}$, and an "H" level signal if the former voltage is lower. The sample hold circuit 65 used is constructed to include: a current-voltage converting circuit IVC for converting the monitor current into a voltage; a controller CON made receptive of the difference between the output voltage of the current-voltage converting circuit IVC and a standard voltage Vs for reducing that differential input to zero; a switch SW1 connected with the output terminal of the controller CON; a buffer amplifier AMP made receptive of the output voltage of the controller CON; a capacitor SHC for sample-holding the output voltage of the controller CON; and a switch SW2 connected in parallel with that capacitor SHC. The sample hold circuit 65 is so constructed that its switch SW1 is closed during the time period $T_0$, in which the output pulse signal $S_5$ of the monostable multivibrator MM1 is at the "H" level, whereas its switch SW2 is opened during the time period in which the output signal $S_4$ of the flip-flop FF1 is at the "L" level.

Numeral 67 indicates a picture information sweeping circuit, and numeral 68 indicates a synchronism control circuit for controlling to open and close the gate of the sweeping circuit 67. This picture information sweeping circuit 67 has its internal memory stored with data for writing in the badge or the normal picture information to feed out the data for one line (i.e., for one scanning line) as an output signal $S_6$ at a constant timing each time its output gate is opened by the synchronism control circuit 68. The content of the output signal $S_6$ of the sweeping circuit 67 is the data for writing the badge, after the rise of the badge-on signal $S_2$, and the data for writing the normal picture information, after the break of the same. Incidentally, the sweeping circuit 67 is so constructed that it feeds the central processing unit 61 with sweep finish signal when it finishes the sweeping operation of the data of one page.

On the other hand, the synchronism control circuit 68 of the embodiment being described consists of a flip-flop and a variety of gate circuits. In the synchronism control circuit 68, specifically: letter G1 indicates an OR circuit made receptive of the output signal $S_3$ of the beam position detecting circuit 63 and the output signal $S_4$ of the flip-flop FF1; letters FF2 indicates a flip-flop adapted to be reset by the output signal $S_7$ of the OR circuit G1; letter G2 indicates an OR circuit made receptive of the output signal $S_8$ of a Q terminal of the flip-flop FF2 and the output signal $S_6$ of the picture information sweeping circuit 67; letter MM2 indicates a monostable multivibrator for generating a pulse signal $S_9$ having a pulse width Ta in synchronism with the rise of the output signal $S_3$ of the beam position detecting circuit 63; letter MM3 indicates a monostable multivibrator for generating a pulse signal $S_{10}$ having a pulse width Ta+Tb in synchronism with the break of the output signal $S_3$ of the beam position detecting circuit 63; letter MM4 indicates a monostable multivibrator for generating a pulse signal $S_{16}$ having a pulse width Tc in synchronism with the break of the pulse signal $S_{10}$ of the monostable multivibrator MM3; letter G5 indicates an OR circuit for taking a logical sum of the output signals of the monostable multivibrators MM4 and MM3 to generate an output signal having a pulse width Ta+Tb+Tc and the level "H"; letter G3 indicates a NOT circuit made receptive of the output signal of the OR circuit G5; and letter G4 indicates an AND circuit made receptive of both the output signal $S_{11}$ of a Q terminal of the flip-flop FF1 and the output signal $S_{12}$ of the NOT circuit G3 for setting the flip-flop FF2 by its output signal $S_{13}$. Moreover, the aforementioned picture image sweeping circuit 67 has its output gate opened by the break of the output signal $S_9$ of the monostable multivibrator MM2 and closed by the break of the output signal $S_{10}$ of the monostable multivibrator MM3. On the other hand, the AND of the output signal $S_{14}$ of the OR gate circuit G2 and the output of the aforementioned comparator 69 becomes the output signal $S_{15}$ of the AND circuit G6 and is imparted as the modulation signal to the laser modulating circuit 64.

Figure 5:
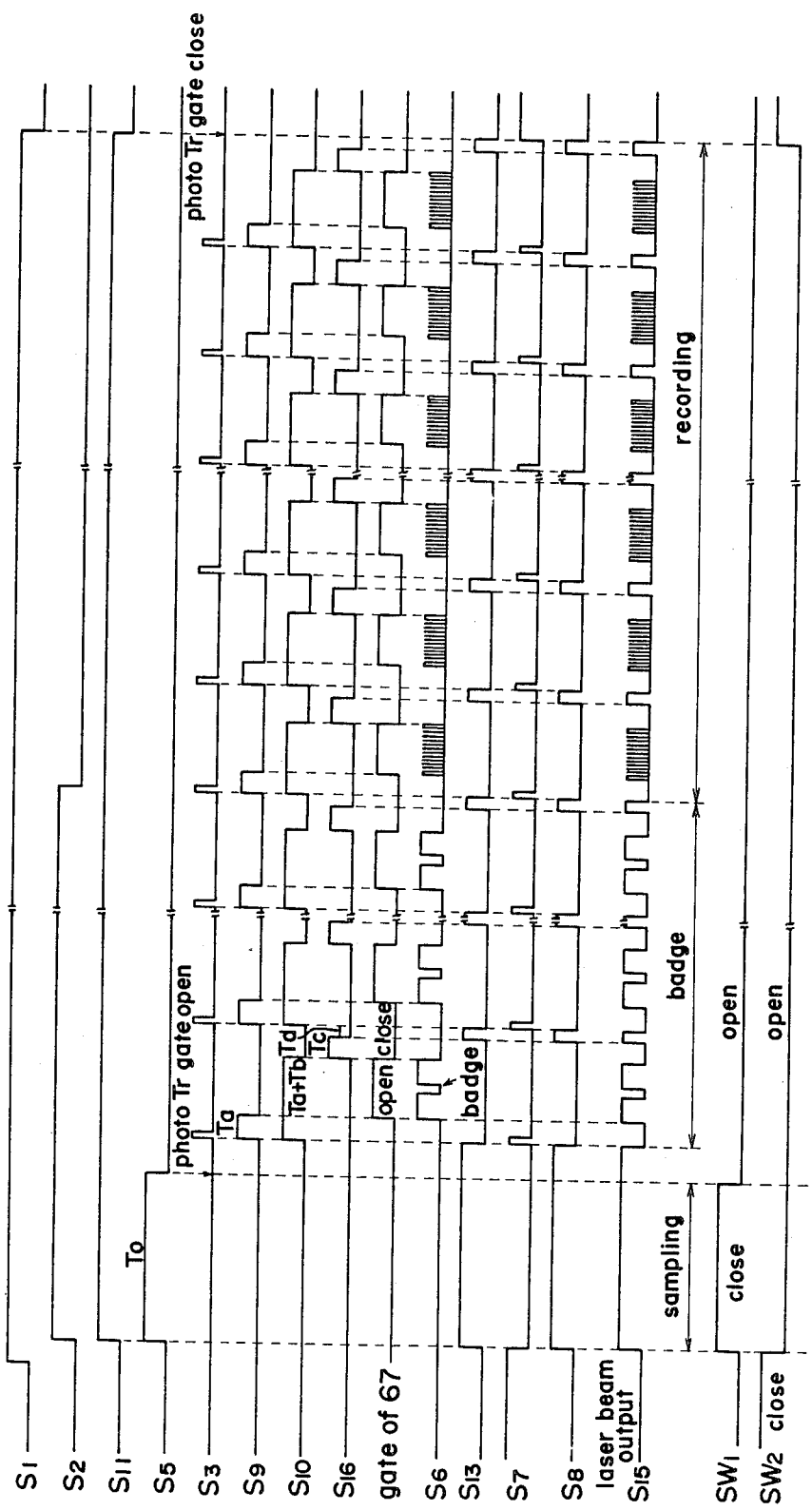
FIG. 5 is an operation explaining view (i.e., a time chart) of the apparatus of FIG. 1.

The operations of the apparatus having the construction thus far described according to the present embodiment will be described with reference to FIG. 5. Incidentally, the development is accomplished by a recording method in which toner is not applied to the exposed areas of the photosensitive member The central processing unit 61 releases its WAIT state when it receives a variety of ready signals such as a temperature ready signal from a temperature controller 62. After that release, moreover, the central processing unit 61 generates first the beam-on signal $S_1$ and then the badge-on signal $S_2$ when it receives the print signal for obtaining the hard copy. As a result, the flip-flop FF1 is set so that the monostable multivibrator MM1 feeds out the pulse signal $S_5$ having the pulse width $T_0$. Thus, the sample hold circuit 65 has its switch SW1 closed but its switch SW2 opened. On the other hand, simultaneously with the flip-flop FF1 is set, the flip-flop FF2 in the synchronism control circuit 68 is also set so that the synchronism control circuit 68 (specifically, the AND circuit G6 feeds out the "H" signal $S_{15}$. As a result, during the time period $T_0$ in which the signal $S_{15}$ is at the "H" level, the laser device 1 feeds out the laser beam, and the controller CON controls the driving power source 66 so that the monitor current may take the reference value. On the other hand, the terminal voltage of the capacitor SHC follows the output voltage of the controller CON during that period $T_0$.

After lapse of the period $T_0$, the switch SW1 in the sample hold circuit 65 is opened so that the output voltage of the controller CON immediately before its switching operation is held in the capacitor SHC to make constant the output of the driving power source 66, i.e., the driving current of the laser diode. Simultaneously with the lapse of the time period $T_0$, the output gate of the beam position locating circuit 63 is opened. As a result, if the laser beam having been reflected by the rotary mirror 2 is incident upon the phototransistor 5 after that output gate has been opened, the beam position locating circuit 63 feeds out the pulse signal $S_3$ to reset the flip-flop FF2. In response to that signal $S_3$, moreover, the monostable multivibrators MM2 and MM3 feed out the pulse signals $S_9$ and $S_{10}$ having the pulse widths Ta and Ta+Tb, respectively. As a result, the output gate of the picture information sweeping circuit 67 is opened, from elapse of the time period Ta after the beam position locating circuit 63 has fed out the pulse signal $S_3$, and is closed after further elapse of the time period Tb. Since the output signal $S_8$ of the flip-flop FF2 is at the "L" level during that period Tb, the output signal $S_6$ of the picture image sweeping circuit 67 is fed, as is the modulation signal $S_{14}$, to the laser modulating circuit 64. After the elapse of the period Tb, moreover, the monostable multivibrator MM4 feeds out a pulse signal $S_{16}$ having a pulse width Tc to set the flip-flop FF2 from elapse of time period Ta+Tb+Tc after the beam position locating circuit 63 has received the laser beam. When the flip-flop FF2 is set, the output signal $S_{15}$ of the synchronism control circuit 68 (specifically, its AND circuit G6) takes the "H" level so that the laser device 1 continuously generates the laser beam. If this laser beam is reflected by the subsequent reflecting surface of the rotary mirror so that it is incident upon the phototransistor 5, the flip-flop FF3 is again reset, and the operations similar to the foregoing ones are subsequently repeated on and on. Since, at first, the badge-on signal fed out of the central processing unit 61 is at the "H" level, the modulation signal $S_{14}$ carries the picture information for writing in the badge so that the badge (e.g., about 200 lines) is written on the photosensitive drum 3. Incidentally, both the moving range of the laser beam during a time period Td from the lapse of the period Tb to the instant when the laser beam is incident upon the phototransistor 5 and the moving range of the laser beam during the aforementioned time periods Ta, Tb and Tc are indicated at letters Ld, La, Lb and Lc in FIG. 1, respectively.

When the badge is written in a necessary quantity on the photosensitive drum 3, the central processing unit 61 lowers the badge-on signal $S_2$ to the "L" level. As a result, the recording time period is started so that the data for writing the normal picture information in place of the badge is fed as the output signal $S_6$ out of the picture information sweeping circuit 67 and, as it is, to the laser modulating circuit 64. As a result, subsequent to the badge, the picture information to be formed into the hard copy is sequentially written on the photosensitive drum 3.

The picture information sweeping circuit 67 feeds the central processing unit 61 with its sweep finish signal when its feeds out the data of the number of lines of one page. In response to that sweep finish signal, the central processing unit 61 lowers the beam-on signal $S_1$ to the "L" level. As a result, the flip-flop FF1 is reset, and the switch SW2 in the sample hold circuit 65 is closed so that the capacitor SHC is shifted to the discharge state. Moreover, the output gate of the beam position locating circuit 63 is also closed. As a result, the recording time period is finished so that the recording system restores the state before it receives the printing signal.

Incidentially, after the beam-on signal $S_1$ is raised to the "H" level, the output voltage (which is proportional to the current fed to the laser diode) of the driving power source 66 is compared always during the recording time period including the sampling operation with the predetermined maximum output voltage $V_{REF}$ so that the output of the comparator 69 is lowered to the "L" level, when the driving power source 66 generates a voltage exceeding that voltage $V_{REF}$, and is transmitted as an alarm signal to the CPU (i.e., the picture information sweeping circuit 67). The signal $S_{15}$ to the laser modulating circuit 64 is stopped as a result that the input to the AND circuit G6 is lowered to the "L" level, and the laser diode is instantly deenergized. Thus, the laser diode is prevented from being broken as a result of an overcurrent flow through the laser diode because of a problem in the circuit. Since and electric oscillation would flow, oscillation is required because the optical output is the output voltage of the driving power source 66 exceeds the voltage $V_{REF}$ only if the laser diode should be broken. When the CPU (i.e., the picture information sweeping circuit 67) receives the aforementioned alarm signal, the machine enters into its WAIT state during which it gives some indication to inform the user of the trouble.

Moreover, the reason why the laser beam is stopped for the time period Tc from the time period Ta+Tb after the beam position locating circuit 63 has received the light ray will be described in the following. Generally speaking, the angular aperture of the f-$\theta$ lens 16 is smaller than the optical deflection angle of the rotary mirror 2. On the contrary, the aperture of the opening of the shroud 15 providing the cover of the rotary mirror 2 is desired to be as small as possible, to avoid problems such as air resistance or dust, and is usually selected to be slightly larger than the aperture angle of the f-$\theta$ lens 16. Therefore, if the laser beam is emitted even after the passage of the recording region, there arises a danger that, when the laser beam is incident upon the edge of the opening of the shroud 15 so that it is scattered, a stray beam may be incident upon the photosensitive drum 3. There is also a danger that the laser beam reflected by the inner wall of the shroud 15 after it has passed that edge may reflect from rotary mirror 2 so that it emanates from the opening and is incident upon the photosensitive drum 3. In order to obviate those dangers, therefore, the beam is stopped for the time period Tc, as has been described above. Incidentally, since the beam position locating circuit 63 is positioned within the effective aperture angle of the f-$\theta$ lens 16, the laser beam is emitted, after the period Tc, to hit the beam position locating circuit 63;

The picture information thus written on the photosensitive drum 3 is transferred as hard copy to the plain paper. Upon reception of a subsequent printing signal, the recording appratus conducts further operations similar to the aforementioned description. In this case, since the capacitor SHC in the sample hold circuit 65 is at its discharge state until it receives the subsequent printing signal, no overcurrent flows through the laser diode in the laser device 1 at the beginning of the driving operation. On the other hand, the output voltage of the driving power source 66, i.e., the driving current of the laser diode, is determined by a new sample holding operation. As a result, little fluctuation in the optical output of the laser diode occurs so that all the hard copies obtainable become homogeneous.

Incidentally, since there is a fear that the edges of the sheet of paper may become black if the laser beam is stopped immediately after the picture information has been recorded, it is desired to superpose a signal as to extend the high signal level before and after the picture information upon the output signal $S_6$ of the sweeping circuit 67 so that the margins at both the sides of the sheet of paper may not become black. The synchronism control circuit 68 may be made to have that function.

On the other hand, the specific construction of the sample hold circuit 65, the synchronism control circuit 68 and so on can be conceived in various ways, and the embodiment thus far described is nothing more than one of those variations. Moreover, most of the sequence control can be conducted by a micro computer. Without the use of the monostable multivibrators, a reference dot counter for the picture information can be counted to determine the appropriate timing.

INDUSTRIAL APPLICABILITY

As has been described hereinbefore, in the recording apparatus according to the present invention, since the sampling time period is prepared outside the recording time period, the frequency response of the feedback system (which corresponds, in the case of the present embodiment, to the sample hold circuit 65 and the driving power source 66) need not be enhanced even if the recording time period is shortened to speed up the printing operation. Moreover, one sampling time period $T_0$ is sufficient for obtaining a hard copy of one page, and that sampling time period $T_0$ is sufficiently retained merely by assigning a portion (e.g., the scanning time period for two or three lines) of the badge writing-in time period. As a result, it is possible according to the present invention to realize a high-speed recording apparatus. Moreover, as is different from the prior art example in which the sampling time period is taken during the recording time period and while effecting the synchronism for every line, the constant time period before the beginning of the recording time period is assigned to the sampling time period so that any complex sequence is not required to simplify the circuit construction. Moreover, since the apparatus of the present invention can be constructed without use of a beam splitter, the problem of the non-linearity is avoided.

We claim:

1. In a recording method wherein a scanning operation is conducted with a light beam which is modulated on the basis of image information, the improvement which comprises driving a laser beam before scanning a leading edge of a page, generating a photoconverted signal of an optical output of said laser beam, repeatedly controlling said optical output based on a difference signal corresponding to a difference between said photoconverted signal and a reference signal so as to reduce said difference and maintaining a power supply to a controlled value during a period of recording said page.

2. The method of claim 1 further comprising scanning an area preceding a leading edge during said controlling, continuing said scanning until said recording is started, and positively developing said page with a toner wherein said toner is attached only on a non-exposed area.

3. In a recording apparatus wherein scanning is conducted by means of a light beam which is modulated on the basis of image information, the improvement which comprises a semi-conductor laser, a circuit for driving said semi-conductor laser, a circuit for generating a timing signal for driving said laser before scanning a leading edge of a page, a circuit for detecting an optical output of said laser and generating a photoconverted signal, a circuit for comparing said photoconverted signal with a reference signal, a circuit for generating a constant signal for making said optical output constant on the basis of a signal from said comparing circuit, and a circuit for holding said constant signal during a recording period of said page.

4. In the apparatus of claim 3, the improvement which further comprises a circuit which generates a badge signal for writing a badge of reference density in an area before a leading edge according to said timing signal.

* * * * *